March 4, 1958 M. LOGAN 2,825,792
COFFEEMAKER WITH DETACHABLY SECURABLE HEATING MEANS
Filed Feb. 24, 1956 2 Sheets-Sheet 1
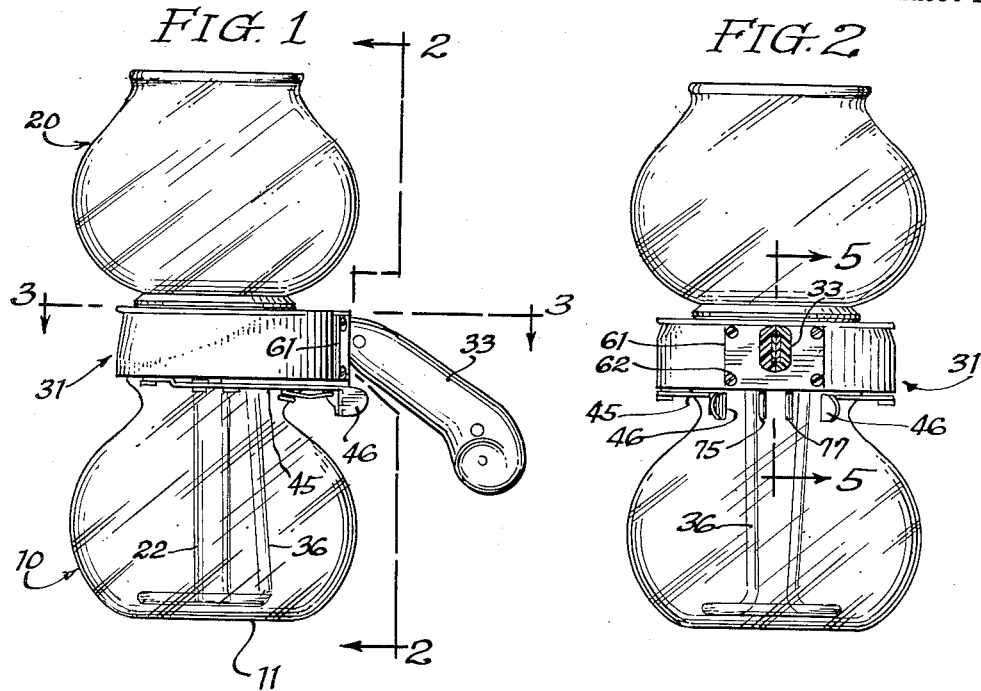
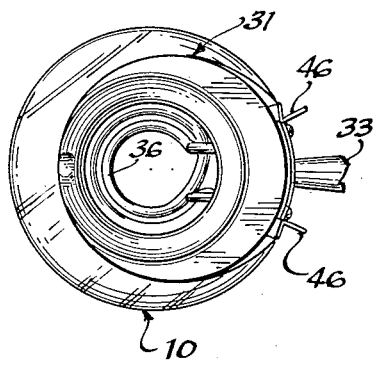
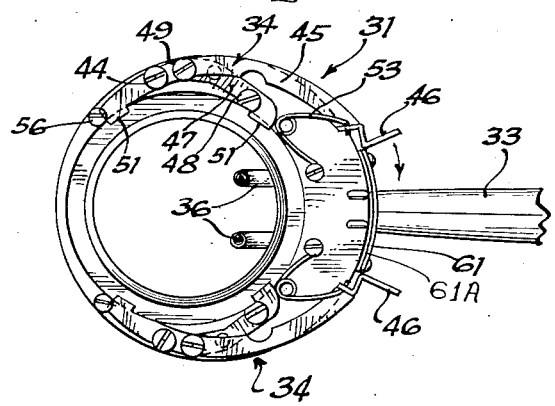
INVENTOR.
Malcolm Logan
BY
Attorney March 4, 1958
M. LOGAN
2,825,792
COFFEEMAKER WITH DETACHABLY SECURABLE HEATING MEANS
Filed Feb. 24, 1956
2 Sheets-Sheet 2
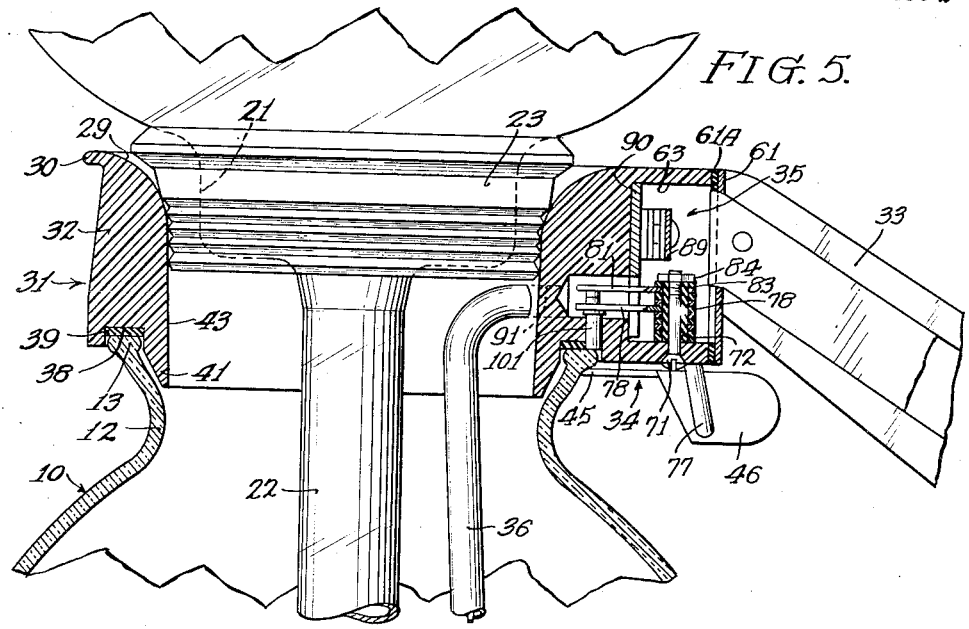
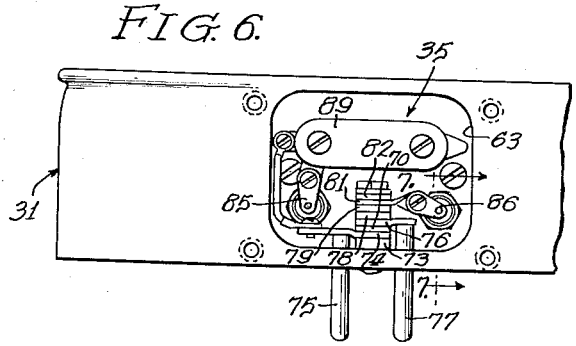
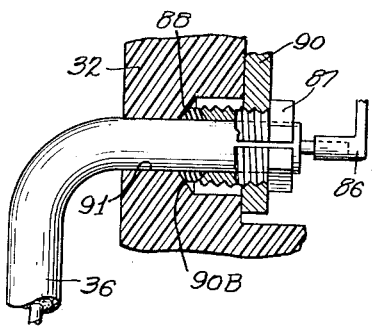
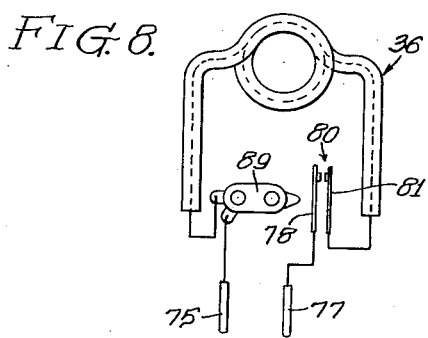
INVENTOR.
Malcolm Logan
BY
Attorney United States Patent Office 2,825,792
Patented Mar. 4, 1958

2,825,792
COFFEEMAKER WITH DETACHABLY SECURABLE HEATING MEANS

Malcolm Logan, Cary, Ill.

Application February 24, 1956, Serial No. 567,556

10 Claims. (Cl. 219—44)

This invention relates to a coffeemaker or the like utensil having a detachably securable heating device. More specifically it has reference to a vacuum type coffeemaker to which the device is adapted and which device includes a handle and thermostatic controls.

Present day coffeemakers of the vacuum type include a lower bowl provided with a handle and an upper bowl fitting a neck of the lower bowl, and which also has a nozzle extending into the lower bowl whereby an infusion of coffee is made in the upper bowl as the heated water is forced thereinto by steam pressure in the lower bowl. Thereafter condensation of the steam in the lower bowl causes a relative increase of pressure on the liquid in the upper bowl and permits reverse flow and the brewed coffee is served from the lower bowl. Inasmuch as the general type of coffeemaker just described is common further elaboration will not be indulged in.

My invention has for its principal object the provision of heating and control means which may be instantaneously detached from the lower bowl when the same is to be washed.

A further object is to provide means which includes a novel form of switch and actuating means therefor to interrupt the circuit to the heater when the heater is removed from the coffeemaker thereby to render the same safe.

Other objects will become apparent from the following description which, taken together with the accompanying drawings, discloses a preferred form which the invention may assume in practice.

In these drawings:

Fig. 1 is an assembly view in front elevation of a coffeemaker embodying the principles of the invention;

Fig. 2 is a similar view but taken on the line 2—2 of Fig. 1;

Fig. 3 is a top plan view of the heating and control unit taken on the line 3—3 but with the upper bowl removed;

Fig. 4 shows an enlarged bottom plan view of the heating and control unit;

Fig. 5 is a somewhat enlarged detail of the heating and control unit in its relation to the upper and lower bowls;

Fig. 6 is a detail view of some of the electrical components as seen when the handle and its mounting bracket are removed;

Fig. 7 is a detail sectional view taken on line 7—7 of Fig. 6; and

Fig. 8 is an electrical circuit diagram.

Regarded in a broad sense the invention, in one aspect, comprises a heating and control unit adapted to be detachably secured to the lower bowl which is more or less of conventional configuration. This unit includes the pouring handle so that upon actuation of the securing means the unit may be removed from the lower bowl whereby cleansing may be performed without concern as to electrical impediments. The bowls of my coffeemaker may be made of glass, aluminum, stainless steel and similar materials.

In another aspect, the invention incorporates a novel arrangement of a thermostatic control directly influenced by the temperature of the heating element and the water whereby the time of infusion may be automatically controlled and the prepared beverage maintained at a comfortable imbibing temperature. In still another aspect the heating and control unit includes an interlock switch adapted to close the supply circuit only so long as the unit is properly assembled with the lower bowl thereby to eliminate the hazard of an energized heated element lying about unguarded.

Turning to the drawings, the coffeemaker comprises a lower vessel or bowl 10 desirably of transparent, heat-resistant glass such as "Pyrex," manufactured by Corning Glass Works, Corning, New York, and including a flat, bottom wall 11, a neck 12 and an outwardly beaded or flanged rim 13. A vessel as just detailed is a commercial article and is readily available at a nominal price so that in the event of breakage the user is not required to go to the trouble and expense of having various metallic and other parts transferred from the broken to the new bowl, and perhaps replaced during the process.

The upper bowl 20 is also a readily available article of commerce and includes a narrowed lower portion 21 which is further restricted in diameter to provide a tubular part or nozzle 22 all as will be understood as to construction and function. The portion 21 receives the customary, annular rubber gasket 23 whereby the upper bowl may be received in the heating and control unit now to be described. Since this gasket also is conventional, maintenance is further simplified.

Positioned intermediate the upper and lower bowls is the heating and control unit 31 comprising as its principal parts a body 32, a handle 33, securing means 34—34, electrical components 35 and heating element 36.

The body 32 is preferably of plastic composition having light weight and resistant to the temperatures encountered in these devices. It is substantially annular and is provided with an annular gasket 39 of flexible material, e. g. rubber to seal the flange 13 with respect to the body 32 and to allow actuation of the safety switch to be described. For convenience in rapid assembly the body 32 may have a portion 41 fitting loosely in the neck 12 thereby serving as a pilot. The inner periphery 43 of the body 32 is designed to receive simply the gasket 23 whereby the upper bowl may be safely carried on the unit 31. It will be noted that the upper part of the periphery 43 is desirably arcuate at 29 to facilitate pouring and that the exterior periphery is incut to define a pouring lip 30 around at least a portion thereof.

In order to provide detachable securement of the unit 31 with respect to the lower bowl 10 there is a pair of latching arrangements 34—34 (Fig. 4) which are mirror images and therefore only one will be described. A shoulder screw 44 threadedly engaged in the underside of the body 31 constitutes a pivot for an arcuate lever 45 having a finger pad 46. A second lever 47 is similarly pivoted at 48 and linked by a screw 49 to the lever 45. Both levers 45 and 47 terminate in a flat finger 51 adapted to engage under the flange 13. Thus movement of the pad 46 in the direction of the arrow (Fig. 4) is instrumental in withdrawing the fingers 51 from engagement under the flange 13 whereby the unit 31 may be lifted off the lower vessel 10 and, vice versa, replaced thereon and locked. Restorative bias to maintain the four fingers 51 normally in locking engagement is provided by grasshopper springs 53. Obviously the finger pads 46—46 will be pinched together by the thumb and forefinger to release the fingers 51. If desired a guide may be provided for the outer end of the lever 45, as by means of a shoulder screw 56.

The handle 33 may be of any convenient form and includes an attaching plate 61 held by screw 62 to the gasket 61A and the body 32. Preferably the plate 61 serves a dual purpose in also covering a compartment 63 entering one side of the body 32 wherein certain of the electrical components may be conveniently housed.

Thus, a stud or bolt 71 extends from below into the compartment 63 and receives an insulating tube 72 upon which are assembled, in order, the following: an insulating washer 73, a lug 74 carrying a terminal prong 75, an insulating washer 70, a lug 76 carrying a second terminal prong 77, a switch leaf 78, a spacing insulator 79, a terminal lug 81, a second switch leaf 82, a top insulating washer 83 and a nut 84 whereby all of the foregoing are clamped in a compact, rigid assembly.

It will be comprehended that a conventional plug and cord set (not shown) will be attached to the prongs 75 and 77 to feed current to the device.

Because the prongs 75—77 of the plug point downwardly the cord carrying the female plug (not shown) will follow the curvature of the lower bowl 11 and will lie flat on the table so as not to get in the user's way.

Carried in bores 91 in the body 32 is the heating element 36 of a well-known character, for example, the "Calrod" type, obtainable from General Electric Company, Schenectady, New York. An element of this type comprises a copper sheath chrome nickel plated on the surface within which a coiled wire, such as Nichrome is carried in a suitable matrix, e. g. magnesium oxide, and which may be readily bent to various contours. Chrome nickel plating the surface of the "Calrod" prevents the "Calrod" from imparting to the coffee an unpleasant taste. In the present instance the element 36 includes one or two spiral turns positioned well down in the lower bowl 10 to assure most efficient utilization thereof. Obviously, the maximum transverse dimension of the element 36 is selected to clear the neck 12 as the heating and control unit 31 is withdrawn.

The terminals 85 and 86 of the element 36 include split nuts 87 for supporting the element on a metal plate 90 and rubber bushing 88 as shown in Fig. 7. For effecting electrical connection one terminal 86 is connected to the terminal lug 81. The other terminal 85 is connected electrically with a thermostat supported on plate 90. The thermostat, indicated at 89 is therefore connected in series as shown in Fig. 8 in a manner well known to the art.

The switch 80 constituted by the leaves 78 and 81 has one of its leaves, say 78, biased downwardly so that the switch is normally open. A plunger 101 is suitably guided in the body 32 and has its upper end engaged with the leaf 78 and its lower end protected below the bottom face of the flexible gasket 39. Accordingly, as long as the unit 31 is locked to the bowl 10 the plunger 101 is thrust inwardly (upwardly) by reason of its lower end contacting the rim 13 and switch 80 is closed. However, upon detachment of the unit 31, the bias of the leaf 78 is effective to open the switch and the heating element 36 is disconnected from the power source.

From the foregoing it will have become clear that I have provided a vacuum type coffeemaker in which the upper and lower bowls are unencumbered by metallic parts of devices rendering them expensive to replace while all of the working parts are incorporated in a compact, detachably securable device which may be instantaneously incorporated with the bowl parts or separated therefrom. It will be noted that the coffee may come into contact only with portions of the element 36 and, since those portions are somewhat remote from the electrical components the same may be rinsed under the faucet. Due to the elimination of mechanical parts and electrical components from the bowls the same may be safely immersed in the dish-washing solution or placed in an automatic dishwasher.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. A coffeemaker comprising a bowl for receiving the fluid having an outwardly extending flange at its rim, means for heating said fluid including an electrical resistance element immersible in the fluid, an annular body part carrying the resistance element to rest on the rim and having an annular flat underface, a lifting handle carried by said annular body part, a pair of latches symmetrically disposed about the center of the body part, said latches having operating fingers disposed for operation jointly with a pinching movement of the thumb and forefinger for releasing said latches, and bias means for normally urging said latches into securing relation with said rim.

2. A coffeemaker comprising a bowl for receiving the fluid having an outwardly extending flange at its rim, means for heating said fluid including an electrical resistance element immersible in the fluid, an annular body part carrying the resistance element to rest on the rim and having an annular flat underface, an annular groove on its underface for receiving the rim and a gasket retained in said groove for sealing the joint between the rim and body part, a lifting handle carried by said annular body part, a pair of latches symmetrically disposed about the center of the body part, said latches having operating fingers disposed for operation jointly with a pinching movement of the thumb and forefinger for releasing said latches, and bias means for normally urging said latches into securing relation with said rim.

3. A coffeemaker comprising a lower bowl having an outwardly flanged rim, an upper bowl including a narrowed portion, a ring gasket carried on said narrowed portion and a nozzle extending almost to the floor of the lower bowl, an annular member intermediate said bowls having its central aperture adapted to receive said gasket with a frictional fit, said member having an annular groove for receiving said rim and a gasket in said groove for sealing said groove and rim, a pair of latches disposed on opposite sides of the member, said latches each including a finger piece for digital disengagement of the latches, and bias means normally urging said latches into rim-engaging position, for detachably securing said member to said lower bowl.

4. A heating device adapted to be operatively associated with a vacuum type coffeemaker of the type which includes a lower bowl having an outwardly flanged rim and an upper bowl and gasket means incorporated with the upper bowl for sealing the upper bowl with respect to pressure generated in the lower bowl comprising: an annular body member having an annular groove for receiving said rim and a gasket in said groove for sealing the rim and member, said member having its central aperture adapted for frictionally receiving the gasket means for mounting the upper bowl on the member and in operative relation with the lower bowl, digitally-operated latching means carried by said member and engageable with said rim for detachably securing said member to the lower bowl, a heating element carried on said member and extending into the lower bowl, terminal prongs on said member for attachment of a plug and cord set, a switch, circuitry connecting said element, switch and prongs, and an operator for said switch having a portion abutting the said rim for closing said switch when the device is operatively associated with the lower bowl and the gasket is subjected to sealing pressure, the switch otherwise being open.

5. A coffeemaker comprising a bowl for receiving the fluid having a rim, means for heating said fluid including an electrical resistance element immersible in the fluid, an annular body part carrying the resistance element to rest on the rim, a pair of latches symmetrically disposed about the center of the body part, said latches having operating fingers disposed for operation jointly with a pinching movement of the thumb and forefinger for releasing said latches, and bias means for normally urging said latches into securing relation with said rim.

6. A coffeemaker comprising a bowl for receiving the fluid having an outwardly extending flange at its rim, means for heating said fluid including an electrical resistance element immersible in the fluid, an annular body part carrying the resistance element to rest on the rim and having an annular flat underface, a pair of latches symmetrically disposed about the center of the body part, said latches having operating fingers disposed for operation jointly with a pinching movement of the thumb and forefinger for releasing said latches, and bias means for normally urging said latches into securing relation with said rim.

7. A coffeemaker comprising a bowl for receiving the fluid having an outwardly extending flange at its rim, means for heating said fluid including an electrical resistance element immersible in the fluid, an annular body part carrying the resistance element to rest on the rim and having an annular underface, an annular groove on its underface for receiving the rim and a gasket retained in said groove for sealing the joint between the rim and body part, a pair of latches symmetrically disposed about the center of the body part, said latches having operating fingers disposed for operation jointly with a pinching movement of the thumb and forefinger for releasing said latches, and bias means for normally urging said latches into securing relation with said rim.

8. A coffeemaker comprising a bowl for receiving the fluid having a rim, means for heating said fluid including an electrical resistance element immersible in the fluid, an annular body part carrying the resistance element to rest on the rim and having an annular underface, an annular groove on its underface for receiving the rim, a gasket retained in said groove for sealing the joint between the rim and body part, latches symmetrically disposed about the center of the body part, said latches having operating fingers disposed for operation with a pinching movement of the thumb and forefinger for releasing said latches, and bias means for normally urging said latches into securing relation with said rim.

9. A coffeemaker comprising a lower bowl having an outwardly flanged rim, an upper bowl including a narrowed portion, a ring gasket carried on said narrowed portion and a nozzle, extending almost to the floor of the lower bowl, an annular member intermediate said bowls having its central aperture adapted to receive said gasket with a frictional fit, said member having an annular groove for receiving said rim, latches disposed on opposite sides of the member, said latches each including a finger piece for digital disengagement of the latches, and bias means normally urging said latches into rim-engaging position for detachably securing said member to said lower bowl.

10. A coffeemaker comprising a lower bowl having an outwardly flanged rim, an upper bowl including a narrowed portion, a ring gasket carried on said narrowed portion and a nozzle extending almost to the floor of the lower bowl, an annular member intermediate said bowls having its central aperture adapted to receive said gasket with a frictional fit, said member having an annular groove for receiving said rim, latches on the member, said latches each including a finger piece for digital disengagement of the latches, and means normally urging said latches into rim-engaging position for detachably securing said member to said lower bowl.

References Cited in the file of this patent

UNITED STATES PATENTS

| 2,664,811 | Jepson | Jan. 5, 1954 |
| 2,682,601 | Andres | June 29, 1954 |
| 2,741,975 | Kueser | Apr. 17, 1956 |
| 2,769,878 | Krichton | Nov. 6, 1956 |

FOREIGN PATENTS

| 647,087 | Great Britain | Dec. 6, 1950 |